June 23, 1936.    J. C. McCUNE    2,045,158
FLUID PRESSURE BRAKE
Filed Feb. 13, 1935
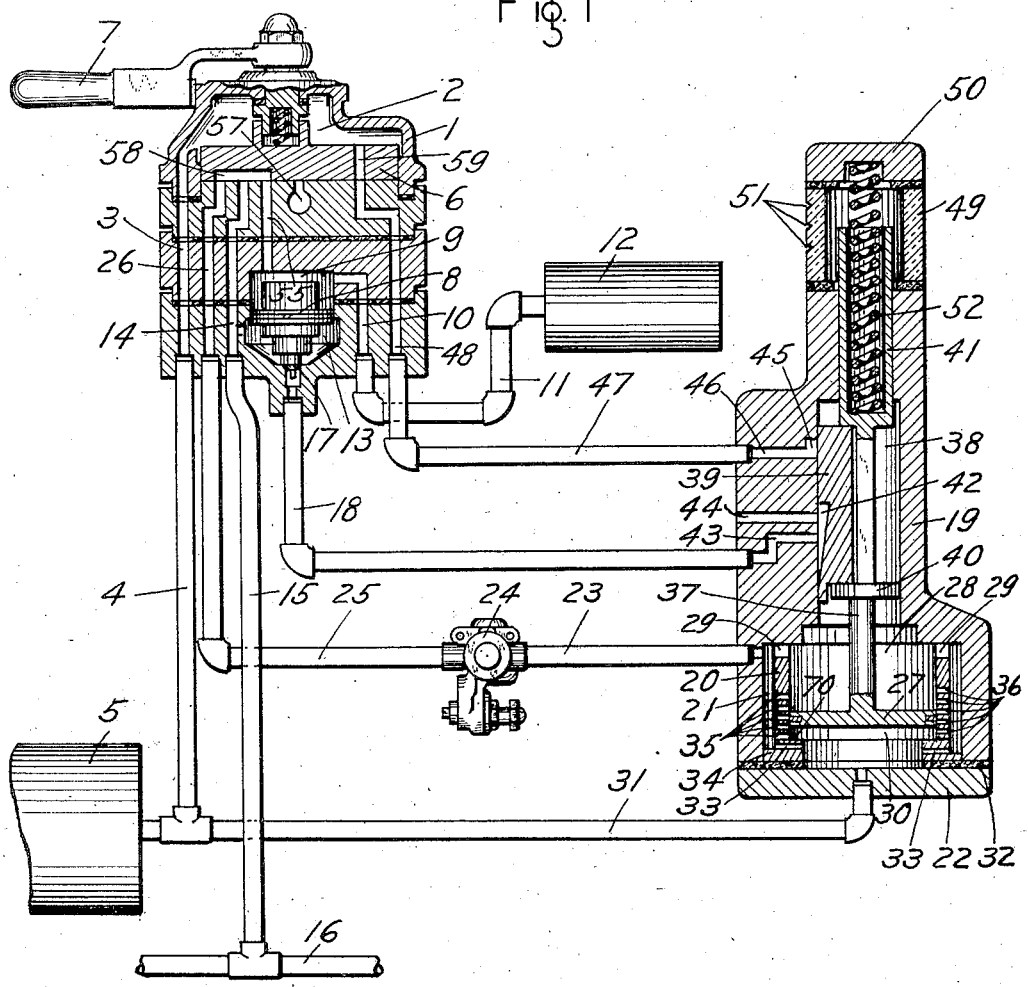
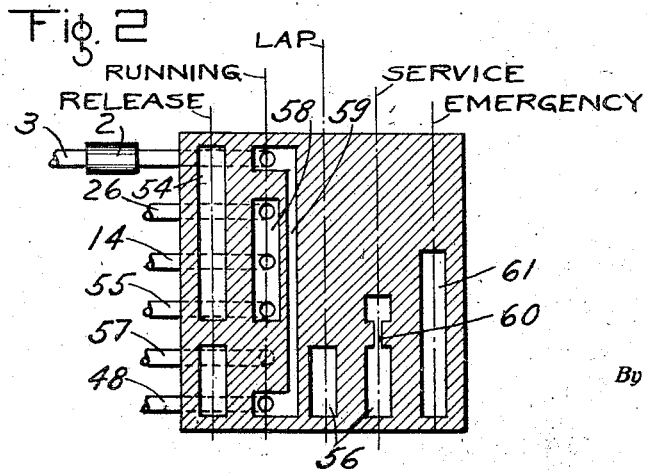
INVENTOR.
JOSEPH C. McCUNE
By *Wm. M. Cady*
ATTORNEY.

Patented June 23, 1936

2,045,158

UNITED STATES PATENT OFFICE 2,045,158

FLUID PRESSURE BRAKE

Joseph C. McCune, Edgewood, Pa., assignor to The Westinghouse Air Brake Company, Wilmerding, Pa., a corporation of Pennsylvania Application February 13, 1935, Serial No. 6,317

24 Claims. (Cl. 303—35)

This invention relates to fluid pressure brakes, and more particularly to a brake system in which the brakes are applied by effecting a reduction in brake pipe pressure.

In order to effect a smooth and safe deceleration of a long train, it is desirable that the reduction in brake pipe pressure at the head end of the train be so controlled as to prevent the brakes at the head end of the train from applying too heavily before the brakes at the rear end commence to apply, in order to avoid harsh running in of the slack in the train, which produces violent shocks and often causes damage to the train.

While the engineer's brake valve device on the locomotive of a long train is held in the usual running position for supplying fluid under pressure from the usual feed valve device to the brake pipe to maintain the brake pipe charged and the brakes released, the fluid pressure obtained in the brake pipe adjacent the locomotive is substantially equal to that at the outlet of the feed valve device. Because of leakage of fluid under pressure from the brake pipe and frictional resistance to flow of fluid through the brake pipe, however, the pressure obtained in the brake pipe at the rear end of the train is lower than that at the front end, the brake pipe pressures obtained at intermediate points along the train being progressively lower in proportion to the distance back from the head end. This variation in pressure throughout the brake pipe of a train is commonly called the brake pipe gradient.

When the engineer's brake valve device is moved from running position to service position to effect an application of the brakes, the supply of fluid under pressure to the brake pipe is cut off and the initially higher brake pipe pressure at the front end of the train is immediately reduced by flow of fluid under pressure toward the rear of the train, where the brake pipe pressure is lower. If the brake pipe gradient is sufficiently great, such tendency of the brake pipe pressure at the head end of the train to equalize with that at the rear, combined with brake pipe leakage and operation of the usual brake pipe discharge valve in the engineer's brake valve device, effects such a rapid reduction in the pressure at the head end of the train as to cause the brakes in the front portion of the train to apply too much in advance of those in the rear portion, with the result that the rear portion of the train is likely to run in on the front portion with damaging force.

The principal object of my invention is to obviate the above difficulty, and to accomplish this object, means is provided which is automatically operative, when the engineer's brake valve device is operated to effect an application of the brakes, to regulate the rate of reduction in brake pipe pressure due to the operation of said brake valve device, in accordance with the brake pipe leakage, so as thereby to offset, in so far as possible, the reduction in brake pipe pressure caused by the brake pipe leakage and gradient.

In the accompanying drawing, Fig. 1 is a sectional, diagrammatic view of a portion of a fluid pressure brake equipment for a locomotive embodying my invention; and Fig. 2 is a diagram showing the port connections made in the different positions of the engineer's automatic brake valve device shown in Fig. 1.

The brake valve device is similar to the usual type employed in fluid pressure brake systems, and comprises a casing 1 having a valve chamber 2 which is connected through a passage 3 and a pipe 4 to the usual main reservoir 5 and which contains a rotary valve 6 adapted to be operated by a handle 7. Mounted in the casing 1 of the brake valve device is the usual equalizing piston 8, having a chamber 9 at one side connected through a passage 10 and a pipe 11 to an equalizing reservoir 12, and having a chamber 13 at the opposite side connected through a passage 14 and a pipe 15 to the usual brake pipe 16. The piston 8 is adapted to operate a brake pipe discharge valve 17 for venting fluid under pressure from the chamber 13 and thereby from the brake pipe to a pipe 18.

According to the invention, an exhaust control device is provided for adjusting the rate at which fluid under pressure is vented from the brake pipe by the operation of the discharge valve 17, in accordance with the degree of brake pipe leakage.

The exhaust control device comprises a casing 19 having a cylindrical bore which contains a bushing 20 of smaller diameter than that of the bore and of substantially the same length as the depth of said bore. A cover plate 22 is secured to the casing, closing the end of the bore, and a gasket 32 is interposed between said cover plate and casing and the outer end of the bushing 20 for preventing leakage of fluid under pressure past the outer end of said bushing. The bushing is provided adjacent its outer end with a collar portion 34, which has a snug fit in the bore for centralizing said bushing therein, so as to form an annular chamber 21, which is connected through a pipe 23 to the inlet side of a feed valve device 24 of the usual type, the outlet side of said feed valve device being connected through a pipe 25 to a passage 26 leading to the seat of the rotary valve 6 in the brake valve device.

A piston valve 27 is slidably mounted in the bushing 20, and has at one side a chamber 28, which is in free communication with the annular chamber 21 through slots 29 provided in the bushing, and has at the opposite side a chamber 30, which is connected through a pipe 31 to the main reservoir 5.

The bushing is provided interiorly with an annular shelf-like stop 70 adapted to limit downward movement of the piston 27, and ports 33 are provided radially through said shelf for establishing communication from chamber 30 to chamber 21. A row of relatively small ports 35 is provided through the side wall of the bushing 20, said ports being preferably spaced along a line extending lengthwise of said bushing, and a row of similar ports 36, disposed in staggered position relative to ports 35, is provided through the wall of the bushing preferably diametrically opposite said ports 35, the piston valve 27 being adapted to open one or more of said ports 35 and 36 according to its position in the bushing.

The piston valve 27 is provided with a stem 37 which extends through a slide valve chamber 38 and is connected to one end of a sleeve-like spring guide 41 slidably mounted in a suitable bore in the casing.

A slide valve 39 is disposed in the chamber 38 between one end of the spring guide 41 and a collar 40 formed on the stem 37, for operation by the piston valve. The slide valve 39 is provided with a cavity 42 which is adapted to establish communication between an atmospheric exhaust port 44 and a passage 43 leading through pipe 18 to the seat of brake pipe discharge valve 17 in the brake valve device. This cavity is so shaped as to provide different areas of opening between passages 43 and 44 in accordance with the position of the slide valve, and for the purpose of illustration, is shown as having a tapered bottom, i. e., the cavity is shown deeper at one end than at the other.

A loading cavity 45 is provided in the slide valve seat, and is connected through a passage 46, a pipe 47, and a passage 48 in the brake valve device to the seat of rotary valve 6.

The guide 41 extends into an indicator portion of the exhaust control device, which comprises a transparent tube 49, preferably made of glass and clamped between the casing 19 and a cap plate 50, and through which the relative position of the end of the spring guide 41 can always be noted. The tube 49 may be provided with a plurality of indicating marks 51. A spring 52, which is carried by the guide 41, is disposed between said guide and the cap plate 50 for urging the stem 37, slide valve 39, and piston valve 27 downwardly.

In operation, fluid under pressure is supplied to the main reservoir 5 in the usual well known manner, and thence flows through pipe 4 to the rotary valve chamber 2 in the brake valve device and acts on the rotary valve 6 to hold same seated. Fluid under pressure from the main reservoir also flows to pipe 31 leading to chamber 30 in the exhaust control device, and thence through passages 33 to the chamber 21, and from said chamber 21 through slots 29 into chamber 28 and connected chamber 38. Fluid under pressure flows from chamber 21 through pipe 23 to the feed valve device 24, which operates in the usual manner to reduce the pressure to that maintained in the brake pipe, and to supply fluid at such reduced pressure to pipe 25. Fluid at the reduced pressure supplied to pipe 25 flows through passage 26 to the seat of the rotary valve 6.

In either charging the brake pipe 16 initially or in effecting a release of the brakes following an application, it is customary first to move the handle 7 of the brake valve device to release position, wherein fluid under pressure is supplied directly from the main reservoir 5 to the brake pipe by way of valve chamber 2, a cavity 54 in the rotary valve 6, passage 14, and pipe 15, in order to accelerate the charging of the train and hasten release of the brakes. After an interval of time during which the brake valve device is in release position, the handle is moved to the usual running position in which it is generally carried until it is desired to effect an application of the brakes.

With the brake valve device in running position, fluid at the reduced pressure supplied by the feed valve device to passage 26 flows through a cavity 58 in the rotary valve 6 to passage 14 and thence through pipe 15 to the brake pipe 16, thereby completing the charging of the brake pipe and operating to maintain the brake pipe at the normal pressure against leakage. Cavity 58 also connects the feed valve passage 26 to passage 55 leading to the chamber 9 which is connected by passage 10 and pipe 11 to the equalizing reservoir 12, so that said chamber and reservoir are also charged with fluid at the pressure supplied to the brake pipe 16.

In early stages of charging the brake pipe from the feed valve device 24, the ports 33 through the piston stop 70 of the exhaust control device have insufficient capacity to supply fluid under pressure to annular chamber 21 and chamber 28 at as fast a rate as fluid under pressure is discharged from said chambers through said feed valve device to the brake pipe, so that the pressure in said chambers reduces below that in the chamber 30. When a sufficient differential of pressure is thus obtained, the piston valve 27 is moved against the control spring 52 and opens further communication from chamber 30 to chamber 21 through one or more of the ports 35 and 36, so as to permit a more rapid flow of fluid under pressure from chamber 30 to chambers 21 and 28. The number of ports 35 and 36 thus opened to chamber 21 is governed by the rate at which fluid is being drawn through the feed valve device and is sufficient to permit the opposing pressures acting on piston 27 to become balanced so that said piston ceases movement upwardly.

As the brake pipe pressure increases, the rate of flow of fluid under pressure from chamber 21 through the feed valve device slows down, and with an excess of ports 35 and 36 open, the pressure in chambers 21 and 28 builds up and thereby reduces the differential of pressures acting on piston valve 27, so that the spring 52 acts to move said piston valve downwardly. This downward movement of the piston valve successively laps ports 35 and 36 and thereby gradually throttles the supply of fluid under pressure from chamber 30 to chamber 21 and connected chamber 28 until the pressure in chambers 21 and 28 is reduced, due to the action of the feed valve device, to a degree sufficiently below that acting in chamber 30 to balance the opposing pressure of spring 52.

In the manner just described, the piston valve 27 will gradually move toward a lower position as the brake pipe pressure approaches the degree supplied by the feed valve device. If there is little or no leakage from the brake pipe, then when the brake pipe becomes charged to the pressure supplied by the feed valve device and said feed valve device ceases to operate, the pressures in chamber 30 and connected chambers 21 and 28 equalize through the ports in the bushing which are open, and spring 52 moves the piston valve into engagement with the stop 70. Ports 33 are always open and ensure the prompt equalization just described after the last of ports 35 and 36 is closed by piston valve 27.

In case there is leakage of fluid under pressure from the brake pipe, the piston valve 27, instead of moving into engagement with stop 70 as just described, will remain so positioned that the pressure maintained in chambers 21 and 28, against the action of the feed valve device to maintain brake pipe pressure against leakage, is sufficiently lower than that in chamber 30 to balance the pressure of spring 52. If brake pipe leakage is of slight degree, so that a comparatively slow rate of withdrawal of fluid under pressure from chamber 21 due to action of the feed valve device 24 is sufficient for maintenance of brake pipe pressure, perhaps the opening of only one of the ports 35 and 36 to chamber 30 will suffice to maintain a pressure in chambers 21 and 28 such as to hold the exhaust control device in a state of equlibrium. If the leakage is severe, this state of equilibrium may not be obtained until the piston valve has opened substantially all the ports 35 and 36, or in other words, the position assumed by the piston valve 27 when the brake valve device is in running position depends upon the degree of leakage of fluid under pressure from the brake pipe.

It will be noted that the positioning of piston valve 27 as just described also positions the slide valve 39, so that the area of communication through cavity 42 between passage 43 and atmospheric exhaust passage 44 is adjusted according to the degree of brake pipe leakage, the maximum area of communication through said cavity being obtained in case there is no brake pipe leakage, and the minimum area of communication being obtained in case there is severe leakage.

In order to render the slide valve 39 freely movable on its seat while the brake valve device is in running position, fluid at main reservoir pressure acting in the valve chamber 2 of said brake valve device is permitted to flow through a port 59 in the rotary valve 6 to the passage 48, and thence through pipe 47 and passage 46 to the loading cavity 45. The area of this cavity is such that the fluid under pressure thus supplied to it exerts a sufficient pressure on the face of the slide valve 39 to counter-balance the opposing fluid pressure acting in chamber 38. By this construction the slide valve offers only slight resistance to movement by the piston valve 27, and consequently may be accurately positioned thereby according to the degree of brake pipe leakage.

With the brake valve device in running position as described, since piston valve 27 assumes a position in the bushing 20 which corresponds to brake pipe leakage, the end of the spring guide 41 assumes a corresponding position in the transparent tube 49 with reference to the indicating marks 51, so that the engineman may at any time note the leakage condition of the train.

In effecting a service application of the brakes, the handle 7 of the brake valve device is moved from running position to service position, wherein the usual preliminary exhaust port 60 in the rotary valve 6 establishes communication between the passage 55 and the atmospheric exhaust port 57. Fluid under pressure is thereupon gradually vented to atmosphere from the equalizing reservoir 12 through pipe 11, passage 10, chamber 9, passage 55, and said ports 60 and 57. Upon the reduction in pressure of fluid in the equalizing reservoir and connected chamber 9 thus effected, the brake pipe pressure acting in chamber 13 moves the piston 8 upwardly and unseats the discharge valve 17.

It should here be noted that after the movement of the brake valve device to service position as above described, a cavity 56 in the rotary valve connects the atmospheric exhaust port 57 with passage 48 leading through pipe 47 to passage 46 and the loading cavity 45 in the exhaust control device. The loading cavity is thereby vented to atmosphere, so that fluid pressure acting in chamber 38 presses the slide valve 39 firmly against its seat, and thereby acts to substantially check further movement of the valve on its seat.

With the discharge valve 17 unseated, fluid under pressure from the brake pipe 16 is permitted to flow through pipe 15, passage 14, chamber 13, past the discharge valve 17, through pipe 18 to the passage 43, and thence through the cavity 42 and passage 44 to atmosphere, so that the brake pipe pressure is reduced to effect an application of the brakes in the usual well known manner. Since the area of communication from the passage 43 through the cavity 42 to the atmospheric exhaust passage has been adjusted in accordance with brake pipe leakage, as hereinbefore described, it will be evident that the rate at which the brake pipe pressure is reduced by flow of fluid under pressure through the brake pipe discharge valve is also in accordance with brake pipe leakage. The resultant total reduction in pressure of fluid in the brake pipe at the head end of the train, which is effected by the combined action of brake pipe leakage and brake pipe gradient plus the above described adjusted exhaust through the brake pipe discharge valve, will thereby be held to the desired rate.

After the desired reduction in equalizing reservoir pressure has been made, the brake valve device may be moved to lap position, in accordance with the usual custom. In lap position, all ports are lapped by the rotary valve 6, except passage 48 and atmospheric exhaust port 57, which remain connected through the cavity 56, thereby holding the slide valve 39 in the adjusted position as hereinbefore described. Since the slide valve is thus held in the position it assumed while the brake valve device was in service position, the further venting of fluid under pressure from the brake pipe necessary to equalize the pressures in said brake pipe and the equalizing reservoir is thereby held to the rate fixed according to brake pipe leakage, it being well known that the reduction in brake pipe pressure takes a longer time than does the reduction in equalizing reservoir pressure at the preliminary exhaust rate.

When the brake pipe pressure in the chamber 13 of the brake valve device has been reduced to a degree slightly less than the pressure in chamber 9 and the equalizing reservoir, the piston 8 will be moved downwardly, causing the discharge valve 17 to seat.

In emergency position of the brake valve device, a direct communication is established, by way of a cavity 61 in rotary valve 6, between passage 14 leading from the brake pipe and atmospheric exhaust port 57, which is also connected by said cavity to passage 55 leading from the equalizing reservoir and to passage 48 leading to the loading cavity 45 in the exhaust control device for holding the slide valve resistant to movement. A very rapid reduction in brake pipe pressure is thereby effected, resulting in the usual emergency application of the brakes in the train. The exhaust control device, being substantially inoperative in such a case, is held resistant to movement as above described to prevent undesired action of its parts.

It will be evident that the invention provides means automatically operative, during the time the brake valve device is in running position, to adjust the rate at which brake pipe pressure will be reduced through the brake valve device when it is moved to effect a service application of the brakes, in accordance with the degree of brake pipe leakage in the train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, a valve mechanism operated upon a reduction in fluid pressure for venting fluid under pressure from the brake pipe, a feed valve device for supplying fluid under pressure to the brake pipe, and means conditioned according to the rate at which said feed valve device supplies fluid under pressure to the brake pipe for determining the rate at which fluid is vented from the brake pipe by operation of said valve mechanism.

2. In a fluid pressure brake, in combination, a brake pipe, a valve mechanism operated upon a reduction in fluid pressure for venting fluid under pressure from the brake pipe, and means conditioned according to the rate at which fluid under pressure leaks from the brake pipe for fixing the rate at which fluid is vented from the brake pipe by operation of said valve mechanism.

3. In a fluid pressure brake, the combination with a brake pipe, of a brake pipe discharge valve for venting fluid under pressure from the brake pipe to effect an application of the brakes, and means for controlling the rate at which fluid under pressure is vented from the brake pipe by operation of said discharge valve, said means being operatively responsive to variations in brake pipe leakage.

4. In a fluid pressure brake, the combination with a brake pipe, of a brake pipe discharge valve for venting fluid under pressure from the brake pipe to effect an application of the brakes, and means operatively responsive to variations in brake pipe leakage for varying the flow area of a communication through which fluid under pressure is vented from the brake pipe by operation of said discharge valve.

5. In a fluid pressure brake, in combination, a brake pipe, a valve mechanism operated upon a reduction in fluid pressure for reducing the pressure of fluid in said brake pipe to effect an application of the brakes, and means operatively responsive to variations in brake pipe leakage for proportionately diminishing the rate of brake pipe reduction made through said valve mechanism when the rate at which the brake pipe pressure is reduced is increased by leakage of fluid under pressure from said brake pipe.

6. In a fluid pressure brake, the combination with a brake pipe, of a brake pipe discharge valve for reducing the pressure of fluid in said brake pipe to effect an application of the brakes, and means automatically operated in accordance with the degree of leakage of fluid from the brake pipe to control the rate at which the reduction in brake pipe pressure is effected through said brake pipe discharge valve.

7. A fluid pressure brake apparatus including a brake pipe, a main reservoir, a feed valve device for supplying fluid at a reduced pressure from the main reservoir to the brake pipe, a brake valve device, and an exhaust control device comprising a movable abutment subject to the pressure of fluid flowing from said main reservoir to said feed valve device, and valve means operably connected to said abutment and adapted to vary the rate at which fluid under pressure is vented from the brake pipe, as effected by operation of said brake valve device, according to the position of said valve means.

8. In a fluid pressure brake, in combination, a brake pipe; a main reservoir; a brake pipe discharge valve for discharging fluid under pressure from the brake pipe in effecting an application of the brakes; and an exhaust control device comprising a movable abutment operatively responsive to differential in pressures acting in the main reservoir and in a chamber connected to the brake pipe and to the main reservoir, said movable abutment being adapted to regulate the rate of flow of fluid under pressure from the main reservoir to the chamber, and valve means operated by said movable abutment for retarding flow of fluid under pressure through the discharge valve in proportion to brake pipe leakage.

9. In a fluid pressure brake, in combination, a brake pipe, a main reservoir, a brake valve device for venting fluid under pressure from the brake pipe to effect an application of the brakes, a feed valve device for supplying fluid from the main reservoir at a reduced pressure through said brake valve device to said brake pipe; and an exhaust control device comprising a movable abutment subject to the opposing pressures of the main reservoir and of a chamber connected to said feed valve device, means for variably establishing communication from said chamber to the main reservoir according to the position of said movable abutment, and valve means operated by said movable abutment and adapted to control the rate at which the brake valve device will vent fluid under pressure from the brake pipe.

10. In a fluid pressure brake, the combination with a brake pipe, a main reservoir, and a feed valve device for supplying fluid at a reduced pressure from the main reservoir to the brake pipe, of a brake valve device having release, running, lap, service and emergency positions, and an exhaust control device comprising valve means for retarding the rate at which fluid is vented from the brake pipe through said brake valve device in proportion to brake pipe leakage in the running position of the brake valve device, a movable abutment subject to the pressure of fluid flowing from the main reservoir to the feed valve device and operably connected to said valve means, and means for rendering said valve means resistant to movement in all positions of the brake valve device except the running position.

11. A fluid pressure brake apparatus including a brake pipe, a main reservoir, a feed valve device for supplying fluid at a reduced pressure from the main reservoir to the brake pipe, a brake valve device having release, running, lap, service and emergency positions, and a brake pipe discharge control device comprising valve means for checking the rate at which fluid under pressure is vented from the brake pipe through said brake valve device in proportion to brake pipe leakage, means operative to render said valve means freely movable in the running position of the brake valve device and resistant to movement in the other positions of said brake valve device, and a movable abutment subject to the pressure of fluid flowing from the main reservoir to the feed valve device for actuating said valve means.

12. In a fluid pressure brake, in combination, a brake pipe; a main reservoir; a feed valve device adapted to reduce the pressure of fluid supplied by the main reservoir for charging the brake pipe; a brake valve device for controlling the venting of fluid under pressure from the brake pipe in effecting an application of the brakes; and an exhaust control device comprising valve means adapted to check the rate of discharge of fluid under pressure through the brake valve device in case there is leakage of fluid from the brake pipe, in accordance with the rate of said leakage, and actuating means automatically operative to control said valve means, said actuating means being responsive to a change in rate of flow of fluid under pressure supplied by the main reservoir in maintaining the brake pipe pressure against leakage.

13. In a fluid pressure brake, in combination, a brake pipe; a main reservoir; a feed valve device adapted to reduce the pressure of fluid supplied by the main reservoir for charging the brake pipe; a brake valve device for controlling the venting of fluid under pressure from the brake pipe in effecting an application of the brakes; and an exhaust control device comprising valve means adapted to check the rate of discharge of fluid under pressure through the brake valve device in case there is leakage of fluid from the brake pipe, in accordance with the rate of said leakage, a movable abutment subject to the opposing pressures of the main reservoir and of a chamber connected to the main reservoir and to the feed valve device, and operatively connected to said valve means, and an indicating device adapted to be operated by said movable abutment to show the relative position of said abutment and thereby the degree of brake pipe leakage.

14. In a fluid pressure brake, in combination, a brake pipe; a main reservoir; a feed valve device adapted to reduce the pressure of fluid supplied by the main reservoir for charging the brake pipe; a brake valve device for controlling the venting of fluid under pressure from the brake pipe in effecting an application of the brakes; and an exhaust control device comprising valve means adapted to control the rate of discharge of fluid under pressure through the brake valve device, and a movable abutment establishing a communication through which fluid is adapted to flow from the main reservoir to the feed valve device and operative to control the operation of said valve means according to the rate of flow of fluid through the communication.

15. In a fluid pressure brake, the combination with a brake pipe, a main reservoir, and a feed valve device for reducing the pressure of fluid supplied by the main reservoir for charging the brake pipe, of a brake pipe leakage indicating device comprising a stationary member, a movable member adapted to move relatively to the stationary member, and a movable abutment which is subject to the opposing pressures of the main reservoir and of a chamber connected to the main reservoir and to the inlet of the feed valve device, adapted to control said movable member.

16. In a fluid pressure brake, the combination with a brake pipe, a main reservoir, a feed valve device for supplying fluid at a reduced pressure from the main reservoir to the brake pipe, and a brake valve device, of an exhaust control device comprising a movable abutment subject to the pressure of fluid flowing from said main reservoir to said feed valve device, valve means operably connected to said abutment and adapted to vary the rate at which fluid under pressure is vented from the brake pipe as effected by operation of said brake valve device, and indicator means operably connected to said abutment and adapted to indicate the relative position of the movable abutment and thereby the approximate degree of brake pipe leakage.

17. In a fluid pressure brake, in combination, a brake pipe, a main reservoir, a feed valve device adapted to reduce the pressure of fluid supplied by the main reservoir, a brake valve device for controlling the venting of fluid under pressure from the brake pipe in effecting an application of the brakes, and an exhaust control device comprising valve means adapted to check the rate of discharge of fluid under pressure through the brake valve device in case there is leakage of fluid from the brake pipe, in accordance with the rate of said leakage, a spring, a piston valve device subject to the opposing pressure of the main reservoir and of the spring and a chamber which is connected to the feed valve device, a bushing having a plurality of ports adapted to establish communication between said chamber and the main reservoir according to the position of the piston valve device, said piston valve device being operatively connected to the valve means, and an indicating device operated by said piston valve device for indicating the degree of brake pipe leakage.

18. In a fluid pressure brake, in combination, a brake pipe, a main reservoir, a brake pipe discharge valve for reducing the pressure of the fluid in said brake pipe to effect an application of the brakes, and valve means operatively responsive to differentials in the pressures acting in the main reservoir and in a chamber connected to the brake pipe for regulating the flow of fluid under pressure from the main reservoir to the brake pipe and for controlling the rate at which the reduction in brake pipe pressure is effected through the brake pipe discharge valve.

19. In a fluid pressure brake apparatus, in combination, a brake pipe, a main reservoir, a feed valve device for supplying fluid at a reduced pressure from the main reservoir to the brake pipe, a brake pipe discharge valve for reducing the pressure of fluid in said brake pipe to effect an application of the brakes, and an exhaust control valve device comprising a movable abutment subject to the pressure of fluid flowing from said main reservoir to said feed valve device, and valve means operatively connected to said abutment and adapted to control the rate at which a reduction in brake pipe pressure is effected through operation of said brake pipe discharge valve.

20. In a fluid pressure brake, in combination, a brake pipe, a main reservoir, a brake valve device having release, running, lap, service and emergency positions, and a control valve device comprising valve means responsive to the pressure of fluid flowing from the main reservoir to the brake pipe for fixing the rate at which a reduction in brake pipe pressure is effected through operation of said brake valve device in effecting an application of the brakes, and means for rendering said valve means resistant to movement in all positions of said brake valve device except the running position.

21. In a fluid pressure brake, in combination, a brake pipe, a main reservoir, and an indicating device comprising a movable abutment subject on one side to the pressure of the fluid in a chamber connected to the brake pipe and subject on the other side to the pressure of the fluid in the main reservoir, said abutment being movable in accordance with the difference in the pressure on opposite sides thereof and being adapted to regulate the rate of flow of fluid from the main reservoir to the brake pipe, and indicating means operated by the abutment in accordance with the movement thereof to show the relative position of said abutment and thereby the degree of brake pipe leakage.

22. In a fluid pressure brake, in combination, a brake pipe, a main reservoir, and an indicating device comprising means subject to and operated by the opposing pressures of the fluid in a chamber communicating with the main reservoir and a chamber communicating with the brake pipe and movable in accordance with the differential in said pressures and controlling the rate of flow of fluid from the main reservoir to the brake pipe, and indicating means operated by said means in accordance with movement thereof to show the relative position of said means and thereby the degree of brake pipe leakage.

23. In a fluid pressure brake, in combination, a brake pipe, a main reservoir, a brake valve device having a running position and an application position, and an exhaust control device having valve means for controlling the rate at which fluid is released from the brake pipe through said brake valve device in the application position of said brake valve device, a movable abutment subject to the pressure of fluid flowing from the main reservoir to the brake pipe and operably connected to said valve means, and means for rendering said valve means resistant to movement in the application position of the brake valve device.

24. In a fluid pressure brake, in combination, a brake pipe, a main reservoir, a brake valve device having a running position and an application position, and an exhaust control device having valve means for controlling the rate at which fluid is released from the brake pipe through said brake valve device in the application position of the brake valve device, a movable abutment subject to the pressure of fluid flowing from the main reservoir to the brake pipe and operably connected to said valve means, and means operative to render said valve means freely movable in the running position of the brake valve device and resistant to movement in the application position of the brake valve device.

JOSEPH C. McCUNE.